United States Patent [19]
Kim et al.

[11] Patent Number: 5,253,488
[45] Date of Patent: Oct. 19, 1993

[54] VEGETABLE STORAGE DRAWER OF A REFRIGERATOR

[75] Inventors: Kyong M. Kim, Anyang; Tae K. Seok, Suwon, both of Rep. of Korea

[73] Assignee: Samsung Electronics Co., Ltd., Suwon, Rep. of Korea

[21] Appl. No.: 898,328

[22] Filed: Jun. 15, 1992

[30] Foreign Application Priority Data

Jun. 13, 1991 [KR] Rep. of Korea ............... 91-9762

[51] Int. Cl.⁵ ............................................. F25D 25/02
[52] U.S. Cl. .................................... 62/382; 62/78; 62/264; 312/402; 362/92; 362/216
[58] Field of Search .................. 62/78, 264, 382; 362/92, 216; 312/402

[56] References Cited

U.S. PATENT DOCUMENTS

| | | | |
|---|---|---|---|
| 4,766,524 | 8/1988 | Ogawa et al. | 362/116 |
| 4,845,958 | 7/1989 | Senda et al. | 62/78 |
| 4,955,208 | 9/1990 | Kawashima et al. | 62/264 |

FOREIGN PATENT DOCUMENTS

1-217170  8/1989  Japan.
2-122187  5/1990  Japan.

*Primary Examiner*—Ronald C. Capossela
*Attorney, Agent, or Firm*—Burns, Doane, Swecker & Mathis

[57] ABSTRACT

A refrigerator includes a vegetable storage drawer. A gas-absorbing member is disposed over the drawer for absorbing noxious gas emitted by vegetables. The gas-absorbing member is formed of zeolite, and an ultraviolet lamp is provided for periodically illuminating the gas-absorbing member to regenerate the latter.

10 Claims, 3 Drawing Sheets

VEGETABLE STORAGE DRAWER OF A REFRIGERATOR

FIELD OF THE INVENTION

The present invention is related to a vegetable storage drawer of a refrigerator which has an absorbing apparatus positioned in the storage drawer for absorbing a noxious gas generated from vegetables and for preserving vegetables for a long period of time.

BACKGROUND OF THE INVENTION

A vegetable storage drawer for a refrigerator is provided in the bottom portion of a refrigerating compartment operating in a sliding manner. The storage drawer contains vegetables therein and is exposed to cold air which circulates in a refrigerating compartment to make the vegetables cool.

One difficulty that sometimes occurs during the storage of vegetables in the storage drawer is that the vegetables can not be preserved for a long period of time. That is, since the gathered-in vegetables continue a respiration process and an aging process, these processes affect the quality of the vegetables during the period of storage. If these processes are prevented from advancing, the fresh state of the vegetables is maintained for a longer period. Particularly, ethylene has the worst affect among the noxious gases acting against the vegetables, and transpires from the respiration of vegetables. The ethylene accelerates the respiration of vegetables, resulting and contributing in the quick aging of the vegetables.

To solve the above the prior art proposed that an absorbing member be housed in the vegetable storage drawer. The absorbing member of the prior art is disclosed in Japanese Patent.

This also has a further problem in that the absorbing member turns to a saturated state as a result of continuous absorption of noxious gases, and thus the absorbing force weakens, requiring that the member be replaced with a new absorbing member periodically.

Accordingly, it is an object of the present invention to provide an absorbing apparatus which maintains a fresh condition of the vegetables due to the noxious gas being absorbed from the vegetable storage drawer.

It is a further object of the present invention to provide an absorbing apparatus which can regenerate the absorbent force of the absorbing member so as to reactivate the saturated absorbing member.

SUMMARY OF THE INVENTION

These and other objects of the present invention are achieved by providing an absorbing member placed on the upper opening of the vegetable box for absorbing ethylene, an ultraviolet lamp positioned over the absorbing member for reactivating the absorbent force of the absorbing member.

As a result of the above structure, the vegetables in the storage drawer are preserved at the proper storage temperature and humidity for a long period of time by controlling the cold air circulating in the refrigerating compartment, and the gas emitted from the vegetables is absorbed by the absorbing member, thereby continuing the fresh condition of the vegetables during an extended period of time. Therefore, the absorbent force of the absorbing member continues to be effective at a higher level.

DESCRIPTION OF THE DRAWINGS

The present invention will now be described in detail with reference to the attached drawings, in which.

DESCRIPTION OF THE PREFERRED EMBODIMENT

Figure 1:
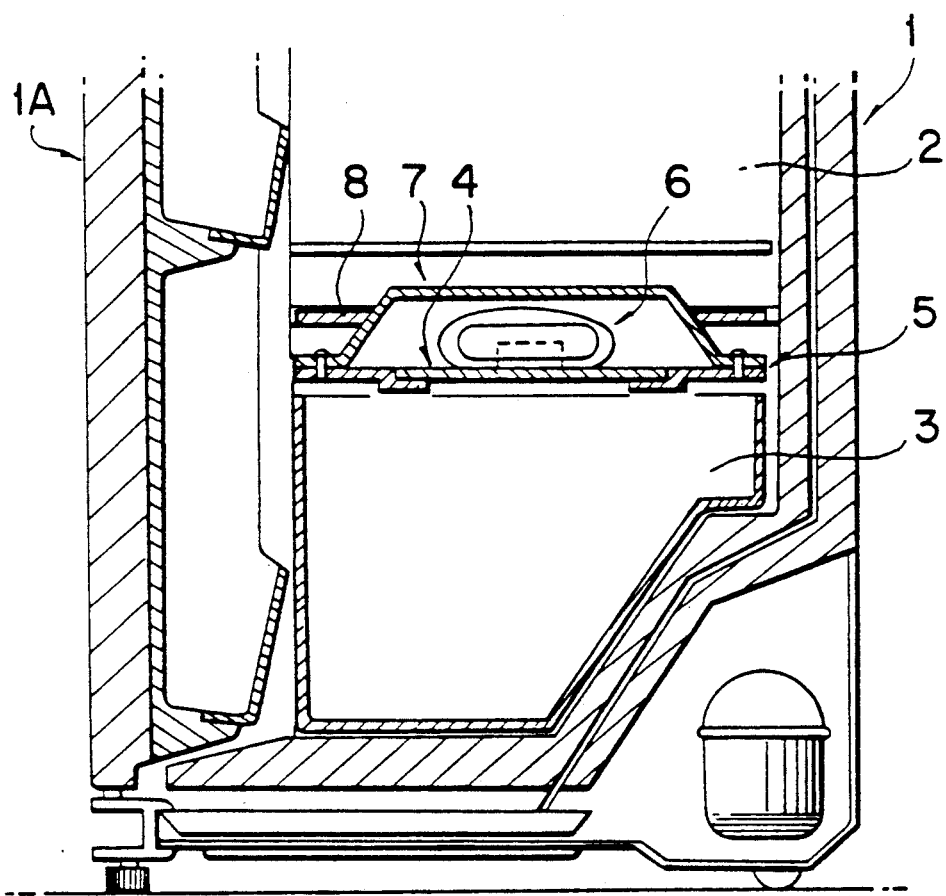
FIG. 1 is a partial vertical sectional view of a refrigerator of the present invention.

FIG. 1 illustrates a vegetable storage drawer having a noxious gas absorbing apparatus for a refrigerator according to the present invention. Body 1 comprises a freezing compartment (not shown) and a refrigerating compartment 2. The refrigerating compartment 2 has a vegetable storage drawer 3 at the bottom portion thereof. A front door 1A is mounted by hinges on the body 1. With the door 1A opened, the vegetable storage drawer 3 can be freely drawn in or out of the refrigerating compartment 2 along a guide rail (not shown) which is formed on each side of the inner wall thereof.

Figure 2:
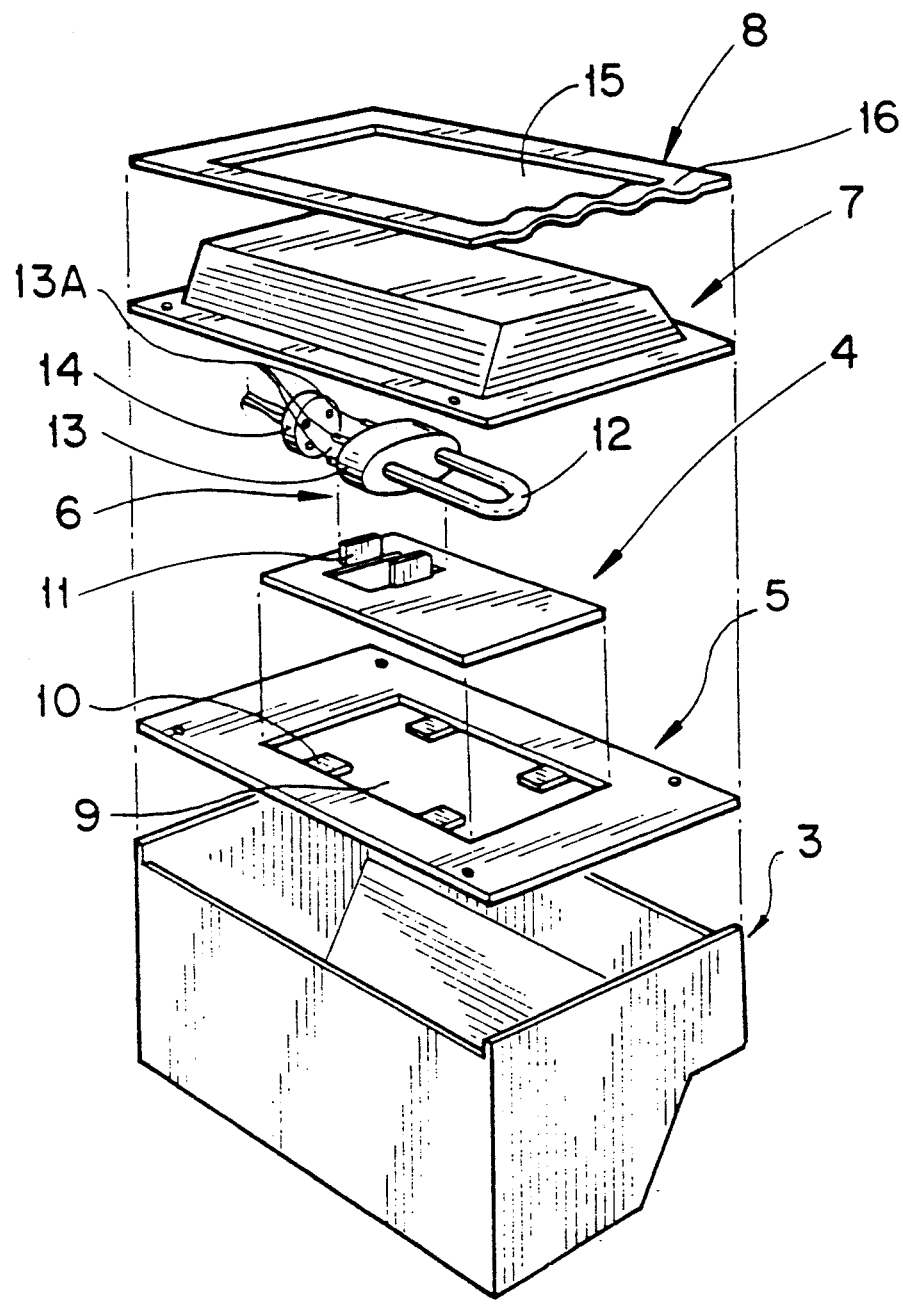
FIG. 2 is an exploded perspective view of a vegetable storage drawer according to the present invention.

The absorbing apparatus, as shown in FIG. 2, is placed above the vegetable storage drawer 3. The absorbing apparatus comprises a cover member 5 having an absorbing member 4 for absorbing noxious gas generated from vegetables, and an ultraviolet illuminating member 6 placed on the cover member 5, for reactivating the absorbing member 4 to return the absorbing force of the absorbing member 4 to an approximate higher level. Further, the absorbing apparatus comprises a reflector 7 detachably mounted on the cover plate 5, for surrounding the illuminating member 6, which prevents the direct passage of light therethrough. A fastener, 8 is mounted on the reflector 7 for elastically mounting the reflector 7 and the cover 5 in the side wall of the refrigerating compartment 2 as will be discussed. An opening 9 is provided in the central portion of the cover member 5. At the lower circumference of the opening 9 a plurality of shoulders 10 are integrally formed and protruding toward an inner portion of the opening 4 so as to hold the absorbing member 4.

The absorbing member 4 is shaped as a plate molded from a zeolite powder which can easily absorb noxious ethylene gas. The illuminating member 6 consists of a U-shaped lamp 12 which emits ultraviolet radiation and a bracket 13 which holds both ends of the lamp 12. The bracket 13 has a plurality of pins 13A connected to a plug 14 which supplies electricity to the lamp 12. The lamp 12 is clamped by means of a clamping portion 11 of the absorbing member 4. The lamp 12 is operated, i.e. ON or OFF, in a predetermined time sequence to reactivate the absorbine member and raise its absorbing force to a higher level. In this embodiment (FIG. 5), the OFF duration is set for 10 hours, while the ON duration is set for 10 minutes. The reflector 7 is formed with an upward protrusion in a central portion thereof, and surrounds the illuminating member 6. The reflector 7 is demountably connected with the cover 5 by means of a plurality of bolts at the upper portion of the cover 5. Owing to this assembly, the light is prevented from streaming through both the reflector 7 and cover 5. The fastener 8 (FIG. 2) is mounted on the reflector 7 by means of an opening 15 formed in the fastener 8 which receives the upward protrusion of the reflector 7. Both sides of the fastener 8 have elastic portions 16 which resiliently engage a guide rail arrangement (not shown) in the side wall of the refrigerating compartment 2 to enable the absorbing apparatus of the present to be slid in or out on the guide rail arrangement. The sliding of the absorbing portion can be performed independently of the vegetable storage drawer 3. As a result of the above structure, the noxious gas, i.e. ethylene gas, generated from the vegetables, is absorbed into the absorbing member 4, thereby diminishing the gas in the drawer 3. When the absorbing member becomes fully saturated so as to decrease the absorbing force, the illuminating member 6 is turned on and the saturated or inert absorbing member turns into an unsaturated or active absorbing member, thereby increasing the absorbing force.

Figure 3:
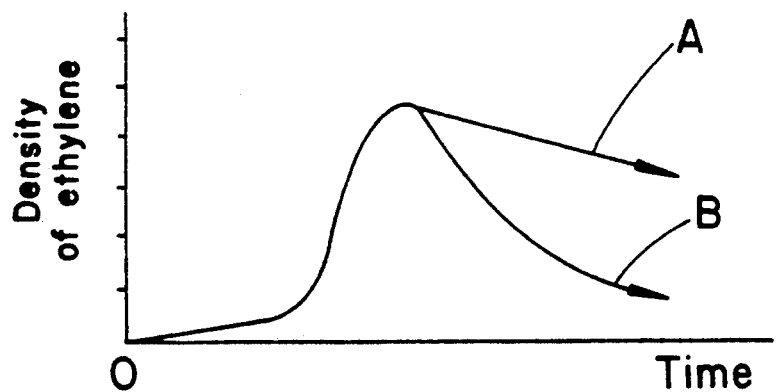
FIG. 3 is a diagram illustrating the density difference of the storage drawer between the prior art and the present invention.

FIG. 3 shows the ethylene density density in the storage drawer varying with time. In the behavior of a prior art absorber, designated by line A, the ethylene density in the storage drawer reaches and holds a higher level. In the present invention designated by line "B", the ethylene density decreases from the high level, even as the absorbing member is being operated.

Figure 4:
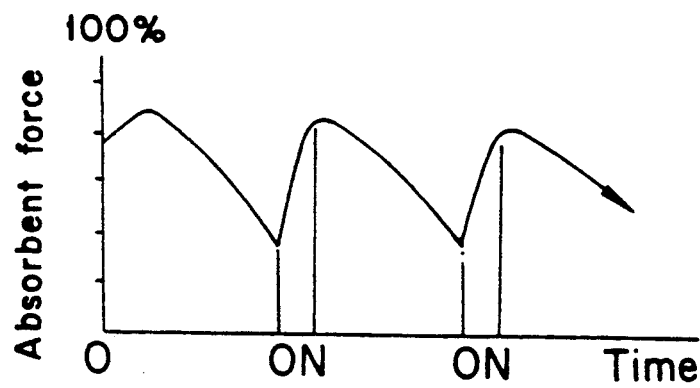
FIG. 4 is a diagram illustrating an absorbent force of an absorbent member according to the present invention.
Figure 5:
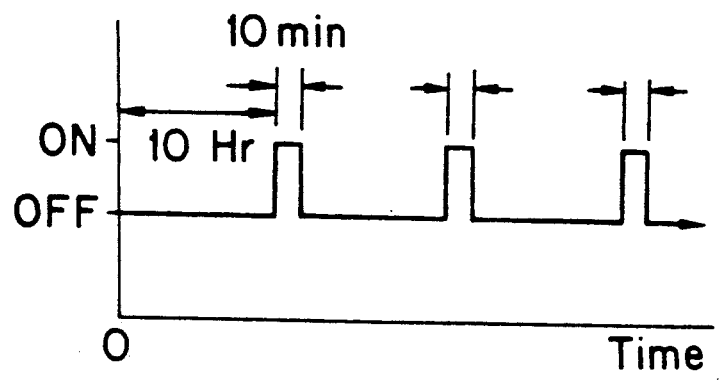
FIG. 5 is a diagram explaining the timed operation of the illuminating member according to the present invention.

Referring to FIGS. 4 and 5, since the ethylene is absorbed by a plurality of apertures in the absorbing member, the absorbent force is being decreased with time. With an operation of a control means (not shown) the lamp turns on to reform the plurality of apertures in the absorbing member. Thus, the absorbent force is regenerated to a higher level.

Accordingly, the present invention enables the storage temperature and humidity in the storage drawer to be properly held as well as the noxious gas which from vegetables to be absorbed by the absorbing member. Furthermore, as the absorbing member is exposed to the ultraviolet light, the saturated absorbing member turns into an unsaturated absorbing member to regain the absorbing force. Thus, this has the further effect in that the maximum absorbing efficiency can be achieved by the constant application of an absorbing force.

What is claimed is:

1. A refrigerator comprising:
   a refrigerator body forming a refrigerating compartment,
   a vegetable storage drawer slidably mounted in said body so as to be capable of being pulled out from and pushed into said refrigerating compartment, said drawer being open at its top, and
   gas absorbing means mounted in said body above said drawer such that said drawer can be pulled out and pushed in relative to said gas absorbing means, said gas absorbing means comprising:
      a gas-absorbing member disposed above said drawer and communicating directly with the inside of said drawer through said open top thereof when said drawer has been pushed in for absorbing noxious gas generated by vegetables, said gas-absorbing member formed of a material capable of being regenerated when illuminated with a regenerating amount of radiation, and
      an illuminating member positioned above said gas-absorbing member for illuminating said gas-absorbing member and directing a regenerating amount of radiation thereagainst.

2. A refrigerator according to claim 1, wherein said illuminating member constitutes an intermittently actuated illuminating member.

3. A refrigerator according to claim 1, wherein said gas-absorbing member is comprised of zeolite.

4. A refrigerator according to claim 3, wherein said illuminating member comprises means for emitting ultraviolet radiation.

5. A refrigerator according to claim 4, wherein said illuminating member comprises a U-shaped lamp.

6. A refrigerator according to claim 1, wherein said illuminating member comprises means for emitting ultraviolet radiation.

7. A refrigerator according to claim 1, wherein said gas-absorbing means includes a cover overlying said drawer when said drawer is closed, said cover including an opening, said illuminating member carried by said cover and positioned over said opening.

8. A refrigerator according to claim 7, wherein said cover including positioning means for positioning said illuminating member.

9. A refrigerator according to claim 1, wherein said gas-absorbing member further includes a reflector disposed above said illuminating member and below a portion of said compartment situated above said drawer, said reflector arranged to reflect radiation toward said gas absorbing member and shield said portion of said compartment from the radiation.

10. A refrigerator according to claim 1, wherein said gas-absorbing means is slidable from said refrigerator independently of said drawer.

* * * * *